US008363911B2

(12) United States Patent
Kao

(10) Patent No.: US 8,363,911 B2
(45) Date of Patent: Jan. 29, 2013

(54) IMAGE IDENTIFICATION APPARATUS AND METHOD FOR COMPARING AN IMAGE FRAME WITH A PREDETERMINED IMAGE

(75) Inventor: De-Yu Kao, Taipei (TW)

(73) Assignee: Princeton Technology Corporation, Hsintien, Taipei County (TW)

( * ) Notice: Subject to any disclaimer, the term of this patent is extended or adjusted under 35 U.S.C. 154(b) by 952 days.

(21) Appl. No.: 12/427,984

(22) Filed: Apr. 22, 2009

(65) Prior Publication Data

US 2009/0279791 A1 Nov. 12, 2009

(30) Foreign Application Priority Data

May 9, 2008 (TW) ................................ 97117141 A

(51) Int. Cl.
*G06K 9/62* (2006.01)
(52) U.S. Cl. ........................................................ 382/118
(58) Field of Classification Search .................. None
See application file for complete search history.

(56) References Cited

U.S. PATENT DOCUMENTS

| 5,040,223 | A | * | 8/1991 | Kamiya et al. | 382/127 |
| 5,588,074 | A | * | 12/1996 | Sugiyama | 382/209 |
| 5,850,470 | A | * | 12/1998 | Kung et al. | 382/157 |
| 5,991,430 | A | * | 11/1999 | Hsu et al. | 382/124 |
| 6,188,781 | B1 | * | 2/2001 | Brownlee | 382/127 |
| 2004/0175021 | A1 | * | 9/2004 | Porter et al. | 382/118 |

* cited by examiner

*Primary Examiner* — Brian P Werner

(74) *Attorney, Agent, or Firm* — Muncy, Geissler, Olds & Lowe, PLLC

(57) ABSTRACT

An image identification apparatus for comparing an image frame with a predetermined image is disclosed. The image identification apparatus includes a transformation module, a first comparing module, a second comparing module and a determination module. The transformation module is used for transforming the predetermined image to a predetermined image data and transforming the image frame to a first image data. The first comparing module and the second comparing module are used for comparing the predetermined image data with the first image information and generating a first comparing result and a second comparing result. The determination module is used for determining the comparing result of the image frame and the predetermined image according to the first comparing result and the second comparing result.

15 Claims, 3 Drawing Sheets

IMAGE IDENTIFICATION APPARATUS AND METHOD FOR COMPARING AN IMAGE FRAME WITH A PREDETERMINED IMAGE

CROSS REFERENCE TO RELATED APPLICATIONS

This Application claims priority of Taiwan Patent Application No. 097117141, filed on May 9, 2008, the entirety of which is incorporated by reference herein.

BACKGROUND OF THE INVENTION

1. Field of the Invention

The invention relates to an image identification apparatus, and more particularly, to an image identification apparatus that is capable of efficiently improving the speed of image comparison.

2. Description of the Related Art

With the development of science and technology, techniques for image processing have matured. Many monitoring apparatuses that have a human face identification system are capable of comparing an image frame acquired by a sensor with a predetermined image. The monitoring apparatuses identify whether the acquired image frame is the desired human face image for security purposes or human face identification.

Conventionally, for performing an image comparison, a predetermined image is first stored in the image identification system in advance, and a sensor is utilized to acquire an image frame. The processor of the image identification system divides each image frame into a plurality of small image blocks, transforms each image block to a corresponding image data and then compares the image data with the pre-stored predetermined image to determine whether the image frame comprises an image which is the same as the pre-stored predetermined image. However, for the aforementioned method, the processor must perform a multitude of operations, as each image data contained in the image frame must be compared with the predetermined image. Additionally, due to the multitude of operations required to be performed by the processor, the time for image comparison is relatively long. As a result, the lengthy time performance limits expanded use for conventional image identification systems.

Therefore, it is important to provide an image identification apparatus capable of conducting image data comparison with reduced data amount, thus improving the speed of the image identification apparatus.

BRIEF SUMMARY OF THE INVENTION

An image identification apparatus and method are provided to reduce data amount needed for image data comparison and to improve the speed of the image data comparison, so as to overcome the aforementioned problems with conventional image identification apparatuses.

An embodiment of an image identification apparatus for comparing an image frame with a predetermined image is provided, wherein the predetermined image comprises a predetermined data. The image identification apparatus comprises a transformation module, a first comparing module, a second comparing module and a determination module. The transformation module is used for transforming the predetermined image to a predetermined image data and transforming the image frame to a first image data, wherein the predetermined image data comprises a first predetermined data and a second predetermined data, and the first image data comprises a first characteristic data and a second characteristic data. The first comparing module is coupled to the transformation module and is used for comparing the first predetermined data with the first characteristic data to generate a first comparing result. The second comparing module is coupled to the first comparing module and is used for comparing the second predetermined data with the second characteristic data to generate a second comparing result according to the first comparing result. The determination module is coupled to the first comparing module and the second comparing module and is used for determining the comparing result of the image frame and the predetermined image according to the first comparing result and the second comparing result.

Another embodiment of an image identification method for comparing an image frame with a predetermined image is further provided. The image identification method comprises the following steps. First, the predetermined image is transformed to a predetermined image data, wherein the predetermined image data comprises a first predetermined data and a second predetermined data. Next, the image frame is transformed to a first image data, wherein the first image data comprises a first characteristic data and a second characteristic data. The first predetermined data is compared with the first characteristic data to generate a first comparing result. The second predetermined data is compared with the second characteristic data to generate a second comparing result according to the first comparing result. Finally, the comparing result of the image frame and the predetermined image is determined according to the first comparing result and the second comparing result.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
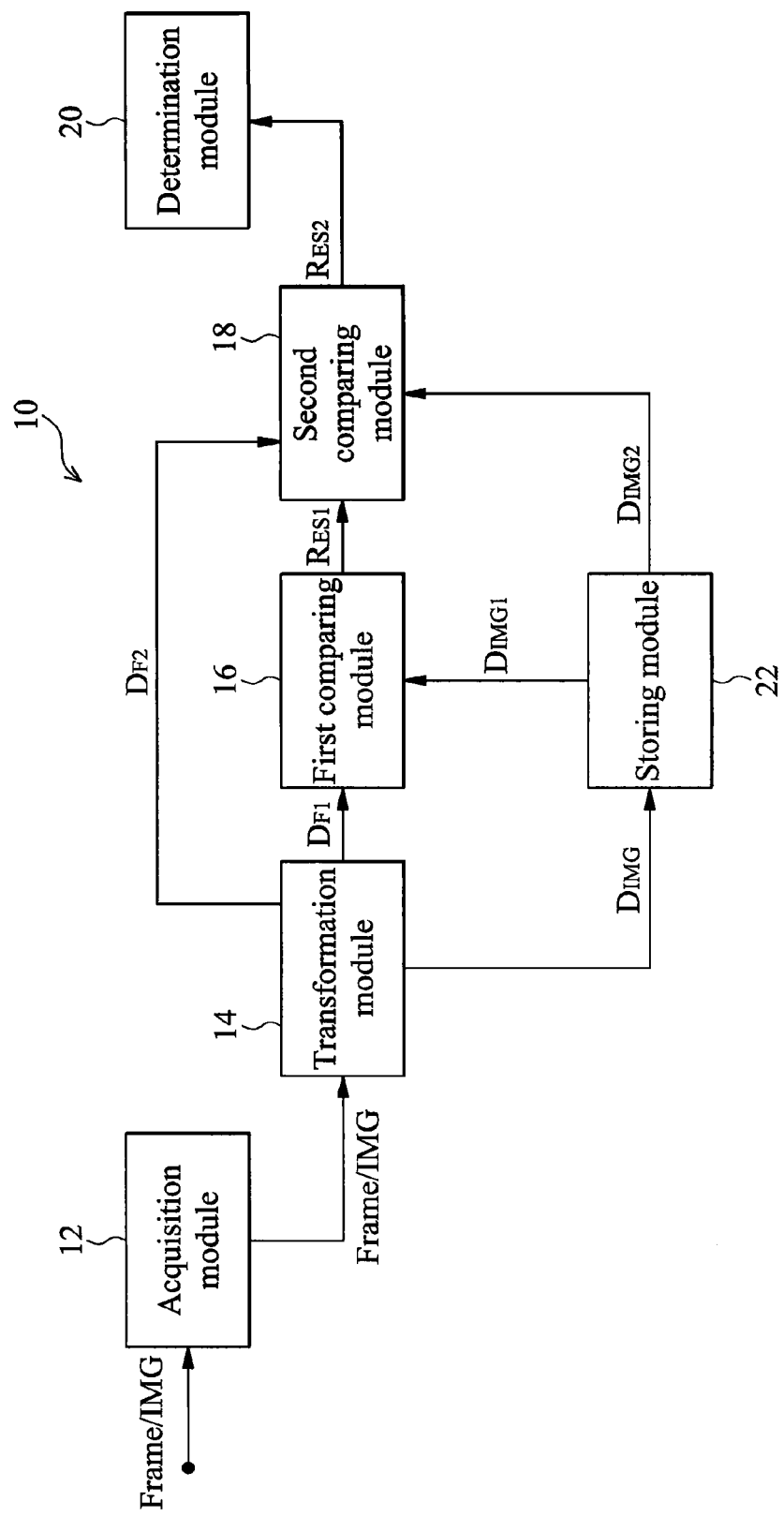
FIG. 1 shows an embodiment of an image identification apparatus according to the invention.

FIG. 1 shows an embodiment of an image identification apparatus according to the invention. As shown in FIG. 1, in this invention, an image identification apparatus 10 for comparing an image frame Frame with a predetermined image IMG is disclosed. The image identification apparatus 10 comprises an acquisition module 12, a transformation module 14, a first comparing module 16, a second comparing module 18 and a determination module 20. The acquisition module 12 is used for acquiring the image frame Frame and the predetermined image IMG. The transformation module 14 is coupled to the acquisition module 12 and is used for transforming the predetermined image IMG to a predetermined image data $D_{IMG}$ and the transformation module 14 is also used for transforming the image frame Frame to a first image data, wherein the predetermined image data $D_{IMG}$ comprises a first predetermined data $D_{IMG1}$ and a second predetermined data $D_{IMG2}$, and the first image data comprises a first characteristic data $D_{F1}$ and a second characteristic data $D_{F1}$. The first comparing module 16 is coupled to the transformation module 14, and is used for comparing the first predetermined data $D_{IMG1}$ with the first characteristic data $D_{F1}$ to generate a first comparing result $R_{ES1}$. The second comparing module 18 is coupled to the first comparing module 16 and is used for comparing the second predetermined data $D_{IMG2}$ with the second characteristic data $D_{F2}$ to generate a second comparing result $R_{ES2}$ according to the first comparing result $R_{ES1}$. The determination module 20 is coupled to the first comparing module 16 and the second comparing module 18 and is used for determining the comparing result of the image frame Frame and the predetermined image IMG according to the first comparing result $R_{ES1}$ and the second comparing result $R_{ES2}$.

When the first comparing result $R_{ES1}$ indicates that the first predetermined data $D_{IMG1}$ is not matched to the first characteristic data $D_{F1}$, the determination module 20 determines that the image frame Frame is different from the predetermined image IMG. When the first comparing result $R_{ES1}$ indicates that the first predetermined data $D_{IMG1}$ matches to the first characteristic data $D_{F1}$, the second comparing module 18 further compares the second characteristic data $D_{F2}$ with the second predetermined data $D_{IMG2}$ to generate the second comparing result $R_{ES2}$. If the second comparing result $R_{ES2}$ indicates that the second predetermined data $D_{IMG2}$ matches to the second characteristic data $D_{F2}$, the determination module 20 determines that the image frame Frame and the predetermined image IMG are the same. In summary, the first predetermined data $D_{IMG1}$ and the first characteristic data $D_{F1}$, which have fewer data amount, is first compared and, if matched, then the second predetermined data $D_{IMG2}$ and the second characteristic data $D_{F2}$, which has more data amount is compared. Therefore, the data amount needed to be compared for the image identification apparatus 10 can be reduced, speeding up image comparison efficiency.

In one embodiment, the image identification apparatus 10 may be used for comparing a human face. In this embodiment, the first characteristic data $D_{F1}$ is image characteristics corresponding to a human face such as a skin color area while the second characteristic data $D_{F2}$ is a complete human face image. Thus, human face identification may be achieved by firstly performing a comparison to check whether the image frame Frame has a skin color area that matches to the image characteristics of the human face and if so, then performing a further comparison to compare the skin color area image that matches to the image characteristics of the human face with the complete human face image. Once it is determined that the image frame Frame does not have a skin color area that matches to the image characteristics of the human face, no further comparison is performed, thereby reducing data amount needed for data comparison.

In one specific embodiment, the acquisition module 12 is a CMOS sensor. Additionally, the image identification apparatus 10 may further comprise a storing module 22 which is coupled to the transformation module 14, the first comparing module 16 and the second comparing module 18 for storing the first predetermined data $D_{IMG1}$ and the second predetermined data $D_{IMG2}$. Due to configuration of the storing module 22, the image identification apparatus 10 may firstly utilize the transformation module 14 to transform a plurality of predetermined images IMG to a plurality of corresponding first predetermined data $D_{IMG1}$ and second predetermined data $D_{IMG2}$ in advance. Then, the transformed first predetermined data $D_{IMG1}$ and second predetermined data $D_{IMG2}$ are further stored into the storing module 22 so that users may select which predetermined image IMG is to be compared and the first predetermined data $D_{IMG1}$ and second predetermined data $D_{IMG2}$ corresponding thereto are compared with the image frame Frame.

Figure 2:
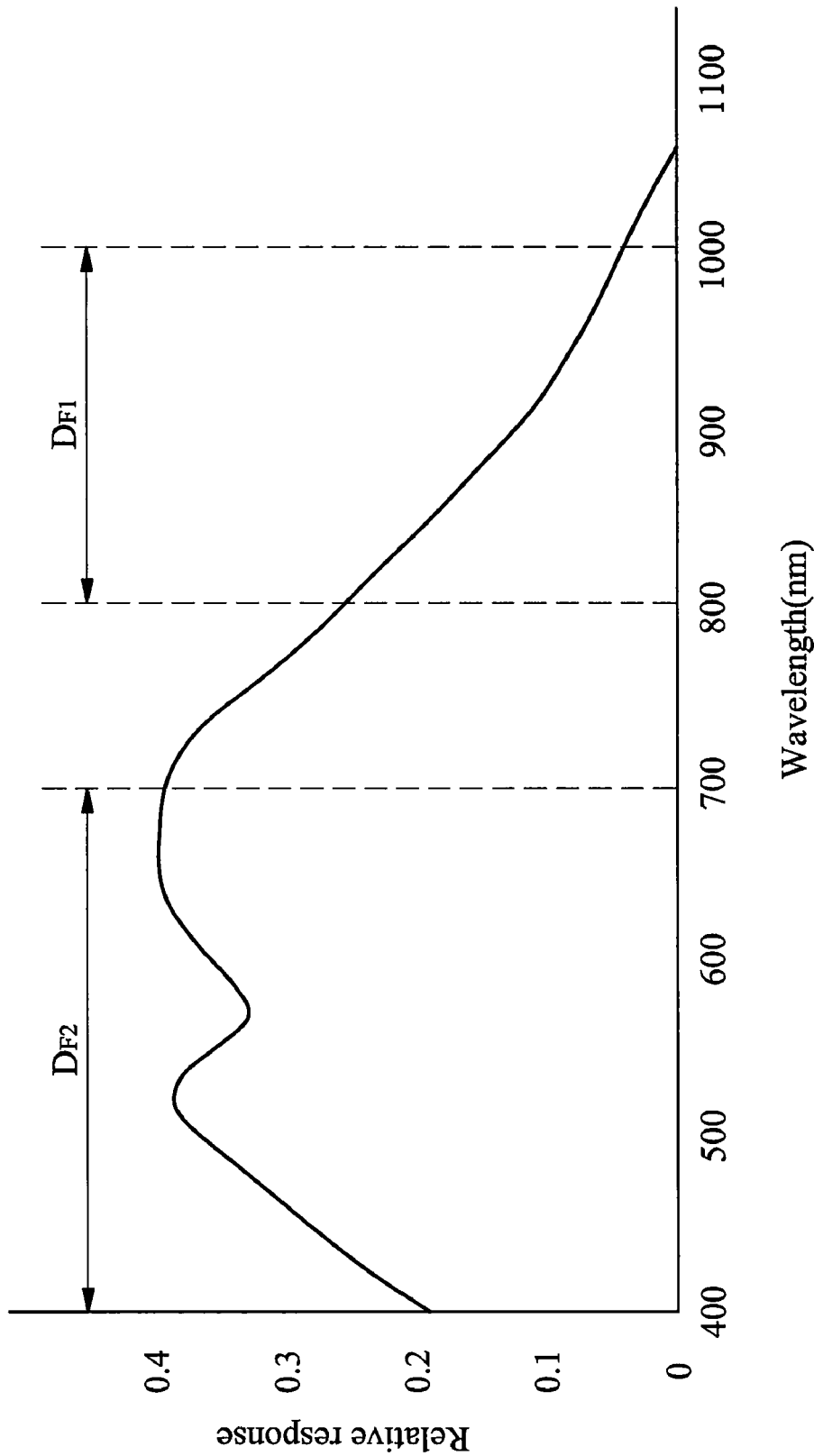
FIG. 2 shows an embodiment of a first image data generated by a transformation module according to the invention.

Please refer to FIGS. 1 and 2. FIG. 2 shows an embodiment of a first image data generated by the transformation module according to the invention. As shown in FIGS. 1 and 2, the transformation module 14 transforms the image frame Frame to the first image data with a waveform representation. The first characteristic data is an image data between a first predetermined wavelength value and a second predetermined wavelength value within the first image data, and the second characteristic data is an image data between a third predetermined wavelength value and a fourth predetermined wavelength value within the first image data, wherein the first predetermined wavelength value is larger than the second predetermined wavelength value, the third predetermined wavelength value is larger than the fourth predetermined wavelength value and the second predetermined wavelength value is larger than the third predetermined wavelength value.

In one embodiment, the first predetermined wavelength value is about 1000 nm (nanometers), the second predetermined wavelength value is about 800 nm, the third predetermined wavelength value is about 700 nm and the fourth predetermined wavelength value is about 400 nm. The first comparing module 16 first compares the first predetermined data $D_{IMG1}$ with the first characteristic data $D_{F1}$ to generate a first comparing result $R_{ES1}$, wherein the wavelength value is between the first predetermined wavelength value (1000 nm) and the second predetermined wavelength value (800 nm) within the first image data. If the first comparing result $R_{ES1}$ indicates that the first predetermined data $D_{IMG1}$ matches to the first characteristic data $D_{F1}$, the second comparing module 18 further compares the second characteristic data $D_{F2}$ with the second predetermined data $D_{IMG2}$ to generate the second comparing result $R_{ES2}$, wherein the wavelength value is between the third predetermined wavelength value (700 nm) and the fourth predetermined wavelength value (400 nm) within the first image data. The determination module 20 later determines the comparing result of the image frame Frame and the predetermined image IMG based on the first comparing result $R_{ES1}$ and the second comparing result $R_{ES2}$. It is to be noted that, in this embodiment, default values of the first, second, third and fourth predetermined wavelength values of the image identification apparatus 10 is only for example, but is not limited thereto. The first, second, third and fourth predetermined wavelength values, therefore, can be adjusted by users based on different default images IMG.

Figure 3:
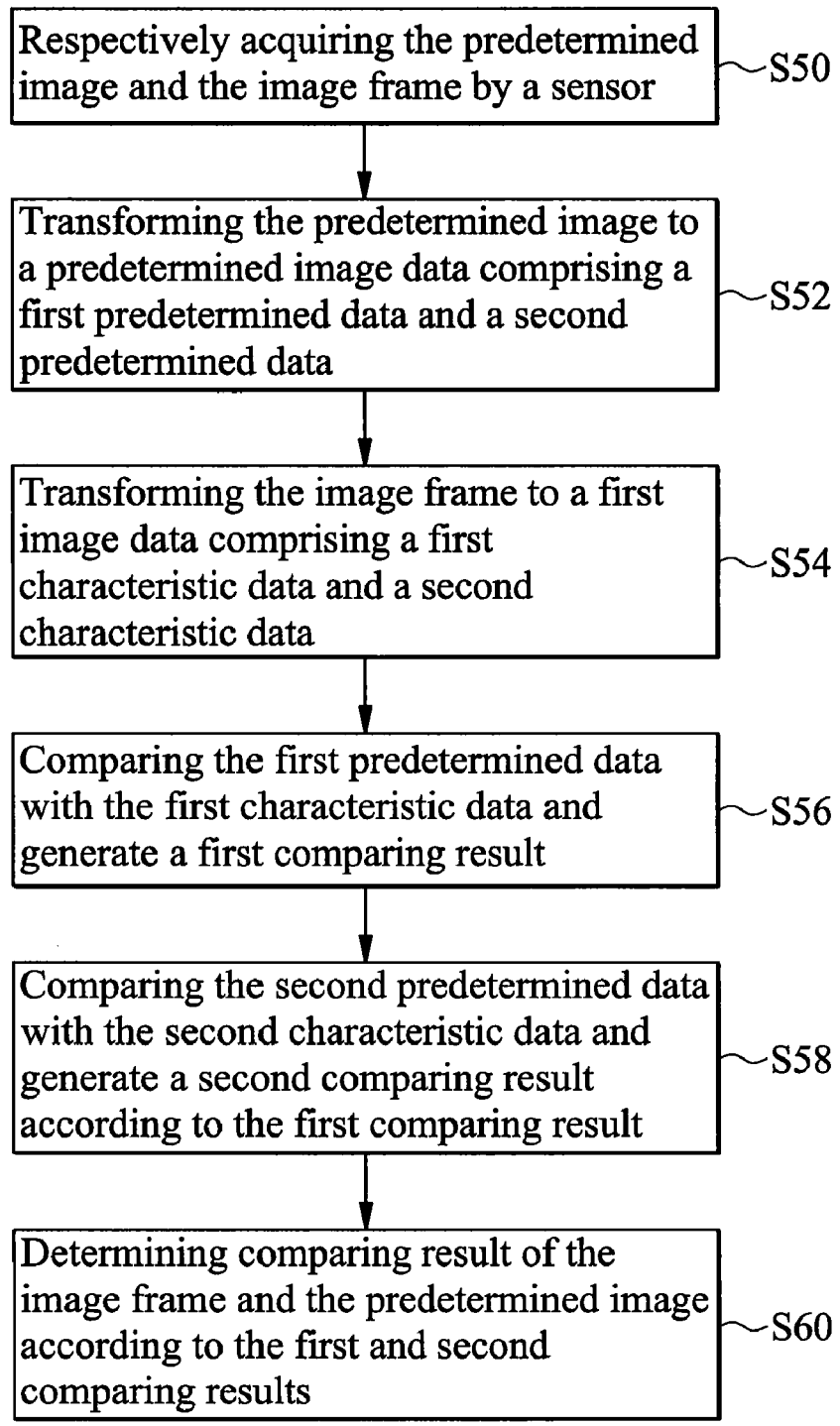
FIG. 3 is a flowchart of an embodiment of an image identification method according to the invention.

Referring to FIG. 3, FIG. 3 is a flowchart of an embodiment of an image identification method according to the invention. As shown in FIG. 3, in another embodiment of the invention, an image identification method for comparing an image frame with a predetermined image is further disclosed. The image identification method comprises the following steps:

S50: Utilizing a sensor for acquiring the image frame and the predetermined image, respectively;

S52: Transforming the predetermined image to a predetermined image data, wherein the predetermined image data comprises a first predetermined data and a second predetermined data;

S54: Transforming the image frame to a first image data, wherein the first image data comprises a first characteristic data and a second characteristic data;

S56: Comparing the first predetermined data with the first characteristic data to generate a first comparing result, wherein in this step, when the first comparing result indicates that the first predetermined data matches to the first characteristic data, step S58 will be performed and when the first comparing result indicates that the first predetermined data does not match to the first characteristic data, step S60 will be performed.

S58: Comparing the second characteristic data with the second predetermined data to generate a second comparing result based on the first comparing result;

S60: determining the comparing result of the image frame and the predetermined image based on the first comparing result and the second comparing result. When the first comparing result $R_{ES1}$ generated by step S56 indicates that the first predetermined data does not match to the first characteristic data, the image frame Frame is determined as different from the predetermined image. When the second comparing result generated by step S58 indicates that the second predetermined data matches to the second characteristic data, the image frame Frame is determined as being the same as the predetermined image.

In one embodiment, the image frame is transformed to the first image data with a waveform representation. The first characteristic data is an image data between a first predetermined wavelength value and a second predetermined wavelength value within the first image data, and the second characteristic data is an image data between a third predetermined wavelength value and a fourth predetermined wavelength value within the first image data, wherein the first predetermined wavelength value is larger than the second predetermined wavelength value, the third predetermined wavelength value is larger than the fourth predetermined wavelength value and the second predetermined wavelength value is larger than the third predetermined wavelength value. In one embodiment, the first predetermined wavelength value is about 1000 nm, the second predetermined wavelength value is about 800 nm, the third predetermined wavelength value is about 700 nm and the fourth predetermined wavelength value is about 400 nm. In addition, the aforementioned image identification method further comprises a step for storing the first predetermined data and the second predetermined data into a storing module. By doing so, pluralities of predetermined images can be stored in advance and then be stored into the storing module so that users may select which predetermined image IMG is to be compared with the image frame Frame to perform a comparison therebetween.

As previously discussed, the image identification apparatus of the invention comprises two data comparison steps in which the first predetermined data and the first characteristic data, which has fewer data amount and less detailed data, are first compared by the first comparing module and, if matched, the second predetermined data and the second characteristic data, which has more data amount and detailed data, are then compared by the second comparing module. Therefore, data amount required for image identification comparison can be significantly reduced, thereby efficiently speeding up image comparison and solving the aforementioned problems in conventional techniques.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. An image identification apparatus for comparing an image frame with a predetermined image, comprising:

a transformation module, transforming the predetermined image to a predetermined image data and transforming the image frame to a first image data, wherein the predetermined image data comprises a first predetermined data and a second predetermined data, and the first image data comprises a first characteristic data and a second characteristic data;

a first comparing module coupled to the transformation module, comparing the first predetermined data with the first characteristic data to generate a first comparing result;

a second comparing module coupled to the first comparing module, comparing the second predetermined data with the second characteristic data to generate a second comparing result according to the first comparing result; and a determination module coupled to the first comparing module and the second comparing module, determining the comparing result of the image frame and the predetermined image according to the first comparing result and the second comparing result, wherein the transformation module transforms the image frame to the first image data with a waveform representation, wherein the first characteristic data is an image data between a first predetermined wavelength value and a second predetermined wavelength value within the first image data, and the second characteristic data is an image data between a third predetermined wavelength value and a fourth predetermined wavelength value within the first image data.

2. The image identification apparatus as claimed in claim 1, wherein the first predetermined wavelength value is larger than the second predetermined wavelength value, the third predetermined wavelength value is larger than the fourth predetermined wavelength value and the second predetermined wavelength value is larger than the third predetermined wavelength value.

3. The image identification apparatus as claimed in claim 2, wherein the first predetermined wavelength value is about 1000 nm (nanometers), the second predetermined wavelength value is about 800 nm, the third predetermined wavelength value is about 700 nm and the fourth predetermined wavelength value is about 400 nm.

4. An image identification method for comparing an image frame with a predetermined image, comprising:

(a) transforming the predetermined image to a predetermined image data, wherein the predetermined image data comprises a first predetermined data and a second predetermined data;

(b) transforming the image frame to a first image data, wherein the first image data comprises a first characteristic data and a second characteristic data;

(c) comparing the first predetermined data with the first characteristic data to generate a first comparing result;

(d) comparing the second predetermined data with the second characteristic data to generate a second comparing result according to the first comparing result; and (e) determining the comparing result of the image frame and the predetermined image according to the first comparing result and the second comparing result, wherein when the first comparing result generated by the step (c) indicates that the first predetermined data is not matched to the first characteristic data, the image frame and the predetermined image are determined as different in the step (e) and wherein the step (b) transforms the image frame to the first image data with a waveform representation, wherein the first characteristic data is an image data between a first predetermined wavelength value and a second predetermined wavelength value within the first image data, and the second characteristic data is an image data between a third predetermined wavelength value and a fourth predetermined wavelength value within the first image data.

5. The image identification method as claimed in claim 4, wherein the first predetermined wavelength value is larger than the second predetermined wavelength value, the third predetermined wavelength value is larger than the fourth predetermined wavelength value and the second predetermined wavelength value is larger than the third predetermined wavelength value.

6. The image identification method as claimed in claim 5, wherein the first predetermined wavelength value is about 1000 nm, the second predetermined wavelength value is about 800 nm, the third predetermined wavelength value is about 700 nm and the fourth predetermined wavelength value is about 400 nm.

7. The image identification apparatus as claimed in claim 1, wherein when the first comparing result indicates that the first predetermined data is not matched to the first characteristic data, the determination module determines that the image frame is different from the predetermined image.

8. The image identification apparatus as claimed in claim 7, wherein when the first comparing result indicates that the first predetermined data matches to the first characteristic data, the second comparing module further compares the second characteristic data with the second predetermined data to generate the second comparing result.

9. The image identification apparatus as claimed in claim 8, wherein when the second comparing result indicates that the second predetermined data matches to the second characteristic data, the determination module determines that the image frame and the predetermined image are the same.

10. The image identification apparatus as claimed in claim 7, further comparing a storing module coupled to the transformation module, the first comparing module and the second comparing module for storing the first predetermined data and the second predetermined data.

11. The image identification method as claimed in claim 4, wherein when the first comparing result generated by the step (c) indicates that the first predetermined data is not matched to the first characteristic data, the image frame and the predetermined image are determined as different in the step (e).

12. The image identification method as claimed in claim 11, wherein when the first comparing result generated by the step (c) indicates that the first predetermined data matches to the first characteristic data, the step (d) is performed.

13. The image identification method as claimed in claim 12, wherein when the second comparing result generated by the step (d) indicates that the second predetermined data matches to the second characteristic data, the image frame and the predetermined image are determined as the same in the step (e).

14. The image identification method as claimed in claim 4, further comprising:
    utilizing a sensor for acquiring the image frame and the predetermined image before steps (a) and (b).

15. The image identification method as claimed in claim 12, further comparing:
    (f) storing the first predetermined data and the second predetermined data.

* * * * *